United States Patent Office 3,270,036
Patented August 30, 1966

3,270,036
ADAMANTYLBIGUANIDES
Jack Bernstein, New Brunswick, and Edward Joseph Pribyl, Metuchen, N.J., assignors to E. R. Squibb & Sons, Inc., New York, N.Y., a corporation of Delaware
No Drawing. Filed Oct. 7, 1965, Ser. No. 493,899
9 Claims. (Cl. 260—343.7)

This invention relates to new compounds of the Formula I.

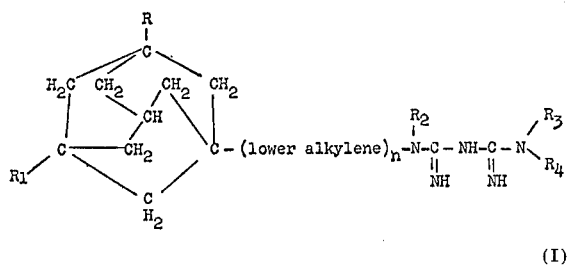

(I)

and to acid-addition salts thereof.

In Formula I, R and $R_1$ each is hydrogen, halogen, lower alkyl, phenyl or lower alkoxy, $R_2$, $R_3$ and $R_4$ each is hydrogen, lower alkyl or phenyl-lower alkyl and $n$ is 0 or 1.

The halogens represented by R and $R_1$ include chlorine, bromine, iodine and fluorine, but the first two are preferred. The lower alkyl groups represented by the symbols R, $R_1$, $R_2$, $R_3$ and $R_4$ include straight and branched chain aliphatic groups such as methyl, ethyl, propyl, isopropyl, butyl, isobutyl, t-butyl, amyl, isoamyl and the like. Methyl and ethyl are preferred. The lower alkoxy groups are ether groups having alkyl groups of the foregoing character attached to the oxygen. The phenyl-lower alkyl substituents contain similar groups, benzyl being preferred.

The lower alkylene groups are straight or branched chain divalent aliphatic hydrocarbon groups of the same type as the lower alkyl groups referred to above. One to two carbon chains are preferred.

The new compounds of this invention may be produced by a variety of methods. The hydrochloride of a primary or secondary amine, containing the desired adamantyl group, is fused with dicyandiamide or a substituted dicyandiamide (substituted cyanoguanidine) and the substituted biguanide hydrochloride recovered from the reaction mixture. Alternatively, the hydrochloride of the primary or secondary amine is reacted with sodium dicyanamide in aqueous butanol to yield the adamantyl substituted dicyandiamide, which is then fused with the hydrochloride of the appropriate primary or secondary amine.

Suitable starting amines for compounds of Formula I include for example, 1-adamantylamine, 3-methyl-1-adamantylamine, 3-phenyl-1-adamantylamine, 3-fluoro, 3-chloro, 3-bromo and 3-iodo-1-adamantylamine, 3,5-dimethyl-1-adamantylamine as well as the adamantyl-lower alkylamines and the N-alkyl compounds corresponding to the above.

These amines may be prepared by the reaction of a 1-halo-3,5-substituted adamantane with acetonitrile followed by hydrolysis of the N-acetyl derivative. In those cases where the substituent is halogen, the halogen is introduced into N-(1-adamantyl)acetamide and the amine recovered by hydrolysis. The N-alkylated-adamantylamines may be prepared by the reduction of an N-(adamantyl)acylamide, such as N-1(adamantyl)acetamide with lithium aluminum hydride or by the alkylation of an adamantylamine such as 1-adamantylamine with an alkyl halide such as methyl iodide.

A further alternate comprises reacting an N-alkylacylamide, such as N-ethylacetamide, with a halo-adamantane such as 1-bromoadamantane and hydrolyzing the N-ethyl-N-(1-adamantyl)acetamide to the N-ethyl-1-adamantylamine.

Reduction of an adamantanecarboxamide such as N-methyl-1-adamantanecarboxamide or an adamantylacyl amide, such as 1-adamantylacetamide with lithium aluminus hydride yields suitable starting amines for compounds of Formula I in which $n$ is one.

Suitable dicyandiamides (cyanoguanidines) for the preparation of compounds of Formula I include dicyandiamide, 3-cyano-1-methylguanidine, 3-cyano-1-ethylguanidine, 3-cyano-1-propylguanidine, 3-cyano-1-isopropylguanidine, 3-cyano-1-isobutylguanidine, 3-cyano-1,1-diethylguanidine and 3-cyano-1-methyl-1-benzylguanidine among others.

The preferred compounds of this invention are those wherein $n$ is 0 or wherein the lower alkylene group has 1 or 2 carbons and R, $R_1$, $R_2$, $R_3$ and $R_4$ are hydrogen and the hydrochloric acid salts thereof.

The bases of Formula I form acid addition salts with a variety of inorganic and organic acids, such salts include, for example, the hydrohalides, e.g., hydrochloride, hydrobromide, sulfate, phosphate, nitrate, sulfonates, e.g., camphorsulfonate, benzenesulfonate, toluenesulfonate, citrate, oxalate, ascorbate, acetate, tartrate, salicylate and the like. It is frequently most convenient to isolate the compound by forming the acid salt and precipitating it in a medium in which it is insoluble. The free base may then be obtained by neutralization.

The compounds of this invention are hypoglycemic agents which are effective in lowering blood sugar content in mammals. Some are particularly noteworthy in their long duration of action. They may be administered orally in the form of tablets, capsules or elixirs or the like by incorporating the appropriate dosage (e.g., 10 to 250 mg.) of the base of Formula I or a physiologically acceptable acid-addition salt, such as the hydrochloride in a conventional vehicle together with excipients, lubricants, preservatives, stabilizers and the like, as required according to accepted pharmaceutical practice.

The following examples are illustrative of the invention. All temperatures are expressed on the centigrade scale.

EXAMPLE 1

*Preparation of $N_1$-(1-adamantyl)biguanide hydrochloride*

A mixture of 18.8 grams of 1-aminoadamantane, hydrochloride and 8.4 grams of dicyandiamide is heated gradually in an oil-bath, with stirring until a clear melt is obtained. The mixture is heated at this temperature for about one hour and is then cooled. The crude product is crystallized from ethanol to yield the desired $N_1$-(1-adamantyl)biguanide hydrochloride.

Following the same procedure but substituting an equivalent amount of the indicated aminoadamantane hydrochloride for the 1-aminoadamantane hydrochloride, the corresponding substituted $N_1$-(1-adamantyl)biguanide hydrochloride is obtained.

| Aminoadamantane.HCl | N₁-Adamantylbiguanide.HCl |
|---|---|
| ![structure with R, R₁, R₂, NH.HCl] | ![structure with R, R₁, R₂, N—C(=NH)—NH—C(=NH)—NH₂.HCl] |
| Example 2: R=H, $R_1$=$CH_3$, $R_2$=H | R=H, $R_1$=$CH_3$, $R_2$=H |
| Example 3: R=$CH_3$, $R_1$=$CH_3$, $R_2$=H | R=$CH_3$, $R_1$=$CH_3$, $R_2$=H |
| Example 4: R=H, $R_1$=H, $R_2$=$CH_3$ | R=H, $R_1$=H, $R_2$=$CH_3$ |
| Example 5: R=H, $R_1$=H, $R_2$=$C_2H_5$ | R=H, $R_1$=H, $R_2$=$C_2H_5$ |

Similarly by substituting an equivalent amount of the indicated substituted cyanoguanidine for the dicyandiamide in the procedure of Example 1, there is obtained the corresponding substituted biguanide hydrochloride.

| Cyanoguanidine | N₁-Adamantylbiguanide.HCl |
|---|---|
| $R_3$\N—C(=NH)—NH—CN / $R_4$ | ![adamantyl structure]—NH—C(=NH)—NH—C(=NH)—N(R₃)(R₄) .HCl |
| Example 6: $R_3$=$CH_3$, $R_4$=H | $R_3$=$CH_3$, $R_4$=H |
| Example 7: $R_3$=$C_2H_5$, $R_4$=H | $R_3$=$C_2H_5$, $R_4$=H |
| Example 8: $R_3$=$C_6H_5CH_2$, $R_4$=H | $R_3$=$C_6H_5CH_2$, $R_4$=H |
| Example 9: $R_3$=$CH_3$, $R_4$=$CH_3$ | $R_3$=$CH_3$, $R_4$=$CH_3$ |
| Example 10: $R_3$=$C_2H_5$, $R_4$=$C_2H_5$ | $R_3$=$C_2H_5$, $R_4$=$C_2H_5$ |

EXAMPLE 11

*Preparation of $N_1$-(3-methoxy-1-adamantylmethyl) biguanide hydrochloride*

(a) PREPARATION OF 3-METHOXY-1-ADAMANTANECARBOXAMIDE

A mixture of 10 grams of 3-methoxy-1-adamantanecarboxylic acid and 20 ml. of thionyl chloride are heated under reflux for thirty minutes. The excess thionyl chloride is removed by distillation under reduced pressure. Ten ml. of benzene is added and the benzene removed by distillation under reduced pressure. The cooled residue is dissolved in benzene and gaseous ammonia bubbled through the solution. The precipitated ammonium chloride is removed by filtration and the filtrate concentrated under reduced pressure to yield the desired 3-methoxy-1-adamantanecarboxamide.

(b) PREPARATION OF (3-METHOXY-1-ADAMANTYLMETHYL) AMINE HYDROCHLORIDE

A solution of 10 grams of 3-methoxy-1-adamantanecarboxamide in anhydrous ether is added slowly to a suspension of lithium aluminum hydride in anhydrous ether. After the addition is completed, the reaction mixture is heated to gentle reflux for 4 hours and is then cooled. Water is added dropwise to decompose the unreacted lithium aluminum hydride, followed by a 10% sodium hydroxide solution. The precipitated solids are removed by filtration and washed with ether. The combined ether solutions are dried over anhydrous potassium carbonate. the solution filtered and treated with a solution of hydrogen chloride in anhydrous ether. The precipitated solid is filtered and crystallized from a mixture of absolute ethanol and anhydrous ether to yield the desired (3-methoxy-1-adamantylmethyl)amine hydrochloride.

(c) PREPARATION OF N₁-(3-METHOXY-1-ADAMANTYLMETHYL)BIGUANIDE HYDROCHLORIDE

Following the procedure of Example 1 but substituting an equivalent amount of (3-methoxy-1-adamantylmethyl) amine hydrochloride for the 1-aminoadamantane hydrochloride there is obtained $N_1$-(3-methoxy-1-adamantylmethyl)biguanide hydrochloride.

EXAMPLE 12

*Preparation of $N_1$-(2-[1-adamantyl]ethyl)biguanide hydrochloride*

Following the procedure of Example 11, but substituting an equivalent amount of 1-adamantylacetic acid for the 3-methoxy-1-adamantanecarboxylic acid there is obtained $N_1$-(2-[1-adamantyl]ethyl)biguanide hydrochloride.

Similarly by substituting the following adamantanecarboxylic acids for the 3-methoxy-1-adamantanecarboxylic acid in Example 11, there is obtained the corresponding substituted $N_1$-(1-adamantylmethyl)biguanide hydrochloride.

| Adamantanecarboxylic Acid | N₁-(1-adamantyl)biguanide.HCl |
|---|---|
| ![structure with R, R₁, COOH] | ![structure with R, R₁, CH₂N(H)—C(=NH)—NH—C(=NH)—NH₂.HCl] |
| Example 13: R=H, $R_1$=F | R=H, $R_1$=F |
| Example 14: R=H, $R_1$=Cl | R=H, $R_1$=Cl |
| Example 15: R=H, $R_1$=Br | R=H, $R_1$=Br |
| Example 16: R=H, $R_1$=I | R=H, $R_1$=I |
| Example 17: R=$CH_3$, $R_1$=$CH_3$ | R=$CH_3$, $R_1$=$CH_3$ |

EXAMPLE 18

*Preparation of $N_1$-(1-adamantyl)-$N_1,N_5,N_5$-trimethylbiguanide hydrobromide*

(a) PREPARATION OF 1-CYANO-3-(1-ADAMANTYL)-3-METHYLGUANIDINE

A mixture of 101 grams of N-methyl-1-adamantylamine hydrochloride and 55 grams of sodium dicyanamide in one liter of n-butanol and 80 ml. of water is stirred and heated under reflux for seven hours. The sodium chloride is removed by filtration and the filtrate concentrated to dryness under reduced pressure. The residue is triturated with water and filtered to yield the desired 1-cyano-3-(1-adamantyl)-3-methylguanidine.

(b) PREPARATION OF $N_1$-(1-ADAMANTYL)-$N_1,N_5,N_5$-TRIMETHYLBIGUANIDE HYDROBROMIDE

A mixture of 23.2 grams of 1-cyano-3-(1-adamantyl)-3-methylguanidine and 12.6 grams of dimethylamine hydrobromide is heated gradually with stirring, in an oil bath. The bath temperature is raised gradually until a clear melt is obtained and is then heated for an additional hour. The reaction mixture is then cooled and the residue crystallized from aqueous ethanol to yield the desired $N_1$-(1-adamantyl)-$N_1,N_5,N_5$-trimethylbiguanide hydrobromide.

EXAMPLE 19

*Preparation of $N_1$-(2-[1-adamantyl]ethyl)biguanide*

A solution of 10 grams of $N_1$-(2-[1-adamantyl]ethyl)-biguanide hydrochloride in 250 ml. of water is cooled and made alkaline by the addition of an equivalent amount of sodium hydroxide solution. The mixture is then allowed to cool at 5° and the precipitated solid is filtered. The solid is recrystallized from aqueous ethanol to yield the desired $N_1$-(2-[1-adamantyl]ethyl)biguanide.

EXAMPLE 20

*Preparation of $N_1$-(2-[1-adamantyl]ethyl)-biguanide oxalate*

A solution of 5 grams of $N_1$-(2-[1-adamantyl]ethyl)-biguanide in warm ethanol is treated with an equivalent amount of oxalic acid in ethanol. Anhydrous ether is added to the cooled mixture and the precipitated solid is filtered to yield the desired $N_1$-(2-[1-adamantyl]ethyl)-biguanide oxalate.

What is claimed is:

1. A compound of the formula

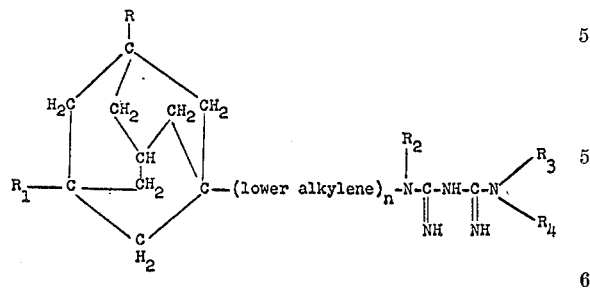

wherein

R and $R_1$ each is hydrogen, halogen, lower alkyl, phenyl or lower alkoxy, $R_2$, $R_3$ and $R_4$ each is hydrogen, lower alkyl or phenyl-lower alkyl, and $n$ is 0 or 1, and acid-addition salts thereof.

2. A compound of the formula

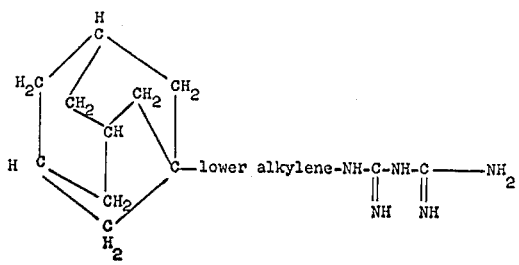

3. A compound of the formula

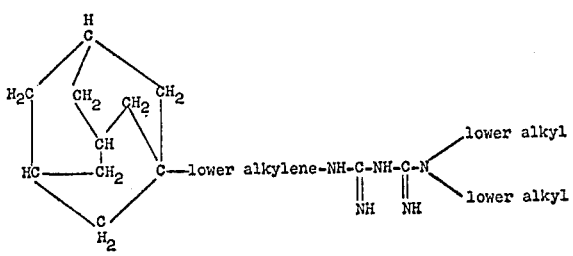

4. A compound of the formula

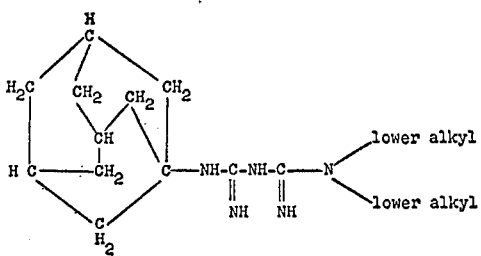

5. $N_1$-(1-adamantyl)biguanide.
6. Acid addition salt of the compound of claim 5.
7. $N_1$-(3-methoxy-1-adamantylmethyl)biguanide.
8. $N_1$-(2-[1-adamantyl]ethyl)biguanide.
9. $N_1$-(1-adamantyl)-$N_1,N_5,N_5$-trimethylbiguanide.

No references cited.

CHARLES B. PARKER, *Primary Examiner.*

ROBERT V. HINES, *Assistant Examiner.*